United States Patent [19]

Acton et al.

[11] 4,023,451
[45] May 17, 1977

[54] BOTTLE BORING APPARATUS

[75] Inventors: Robert C. Acton, Marple Township; Lester R. Sunday, Darby, both of Pa.

[73] Assignee: Westinghouse Electric Corporation, Pittsburgh, Pa.

[22] Filed: Mar. 30, 1976

[21] Appl. No.: 671,849

[52] U.S. Cl. .................................. 82/1.5; 82/14 R
[51] Int. Cl.² ...................... B23B 41/06; B23B 3/28
[58] Field of Search ............... 82/1.5, 14 R; 408/3

[56] References Cited

UNITED STATES PATENTS

| | | | |
|---|---|---|---|
| 2,385,430 | 9/1945 | Von Zelewsky et al. | 82/14 R |
| 2,841,053 | 7/1958 | Horlacher | 82/1.5 |
| 3,119,291 | 1/1964 | Mizunuma et al. | 82/14 R |
| 3,269,232 | 8/1965 | Hovis | 82/14 R |
| 3,301,104 | 1/1967 | Matlack | 82/1.5 |

FOREIGN PATENTS OR APPLICATIONS 214,264   3/1968   U.S.S.R. ................................. 408/3

*Primary Examiner*—Harrison L. Hinson
*Attorney, Agent, or Firm*—F. J. Baehr, Jr.

[57] ABSTRACT

Apparatus for enlarging a portion of a bore of a rotor includes a rotor support and drive and a boring bar with controlled fly cutters, which operate in unison with an indicator that follows a template shaped to correspond to the desired shape of the enlargement.

11 Claims, 6 Drawing Figures

BOTTLE BORING APPARATUS

BACKGROUND OF THE INVENTION

This invention relates to boring apparatus and more particularly to apparatus for enlarging a portion of a bore in a rotor of a steam turbine.

After years of service, turbogenerator units are ultrasonically inspected for cracks and other defects in the walls of a bore. If surface cracks and other defects are detected and removed, the life of the rotor is increased as the cracks and defects produce stress concentration which cause propagation of the cracks that ultimately result in failure of the rotor. Reliable apparatus that is simple to operate and which can be utilized in the field, negates the deed to return the rotor to the factory for repair reducing both cost and down time.

SUMMARY OF THE INVENTION

Apparatus for enlarging a portion of an axial bore in a rotor, when made in accordance with this invention, comprises a device for supporting and rotating the rotor about its longitudinal axis at a predetermined rate, a boring bar axially aligned with the rotor and a device for moving the boring bar generally rectilinearly back and forth along the axis of the rotor. The boring bar has a shaft rotatably disposed therein and the shaft has a worm gear disposed adjacent each end thereof. A segment of a wheel is pivotally mounted in engagement with each worm gear. The wheel on one end has a cutting edge mounted thereon and the wheel on the other edge has indicating means cooperatively associated therewith so that the indicating means and cutting edge move in unison. The apparatus further comprises means for rotating the shaft in the boring bar and a template representative of the shape of the desired enlargement in the bore. The template is disposed a predetermined distance from the desired enlargement, whereby when enlarging the bore the indicating means and template cooperate to indicate the position of the cutting edge relative to the desired shape of the enlargement.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
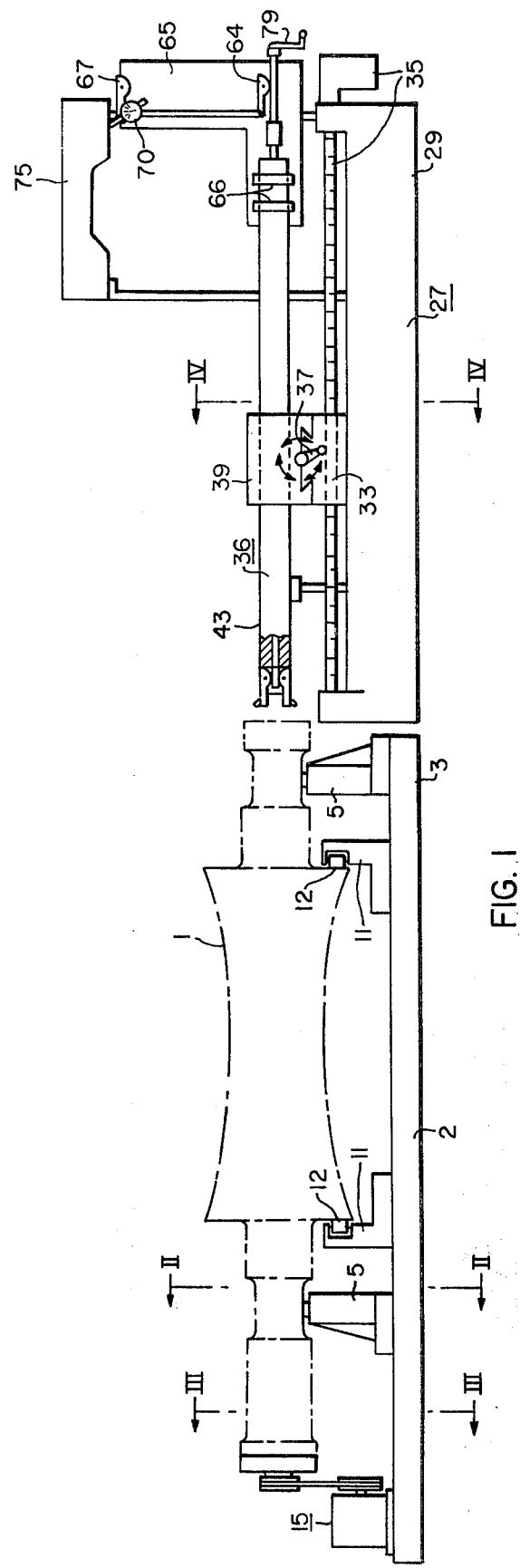
FIG. 1 is an elevational view of a bottle boring apparatus made in accordance with this invention.

Referring now to the drawings in detail and in particular to FIG. 1, there is shown apparatus for enlarging a portion of an axial bore of a rotor 1 often referred to as bottle boring apparatus due to the shape of the enlargement, which has a smooth transition with two reversed curved surfaces similar to the juncture of a neck and body of a bottle.

The bottle boring apparatus comprises means for supporting and rotating the rotor 2. The rotor support and rotating means 2 comprise a base 3 and a pair of bearing support means 5 slidably disposed on the base 3.

Figure 2:
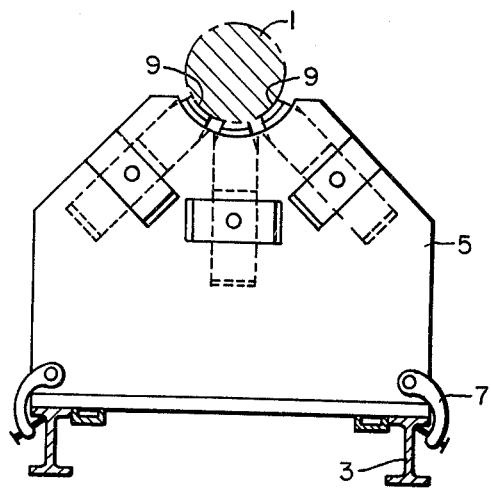
FIG. 2 is a sectional view taken on line II—II of FIG. 1.
Figure 4:
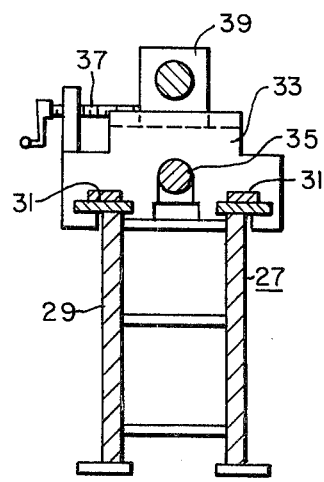
FIG. 4 is a sectional view taken on line IV—IV of FIG. 1.

As shown in FIG. 2 the bearing support means 5 are adapted to slide longitudinally along the rotor base 3 and have clamps 7 or other means for locking the bearing support means 5 in place on the base 3. The bearing support means 5 also have bearing surfaces 9 which are adjustable to accommodate different diameter journal surfaces. Preferably the bearing surfaces 9 are made of babbitt, brass, or other bearing means including rolling surfaces.

Thrust bearing support means 11 are also slidably disposed on the base 3. The thrust bearing support means 11 have a bearing surface 12, which is vertically and horizontally adjustable to support the axial thrust of the rotor 1 during the boring operation.

Figure 3:
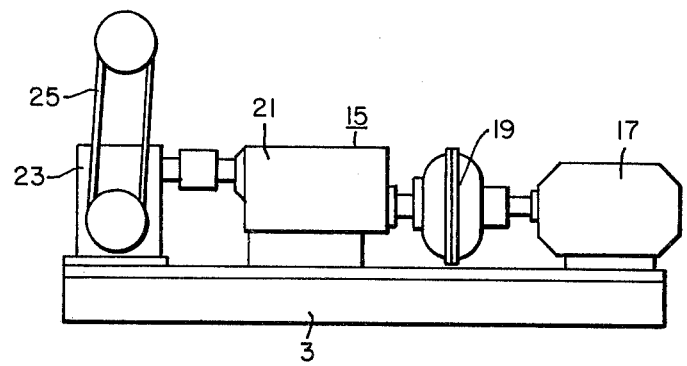
FIG.3 is a sectional view taken on line III—III of FIG. 1.

As shown in FIGS. 1 and 3, means for driving the rotor at various speeds 15 are mounted on the base 3. The rotor drive means 15 comprise an electric motor 17, a clutch or fluid coupling 19, a variable speed drive 21, and a gear reducing means 23. A chain drive or similar power transmitting means 25 connect the rotor drive means 15 to the rotor 1.

Boring bar support and traverse means 27 are disposed adjacent one end of the rotor support and drive means 2. The boring bar support and traverse means 27 comprise a base portion 29 having a pair of longitudinal rails or ways 31, a carriage 33, which moves longitudinally along the rails 31, and means 35 for driving the carriage 33 longitudinally along the rails 31. The carriage drive means 35 are adapted to drive the carriage rapidly to move a boring bar 36 into position or to move the boring bar 36 at a slow rate during the boring operation. The carriage 33 has means 37 disposed thereon which provide a cross feed and a bracket 39 in which the boring bar 36 is mounted. The boring bar is held in axial alignment by the boring bar mounting bracket 39 disposed on the carriage 33.

Figure 5:
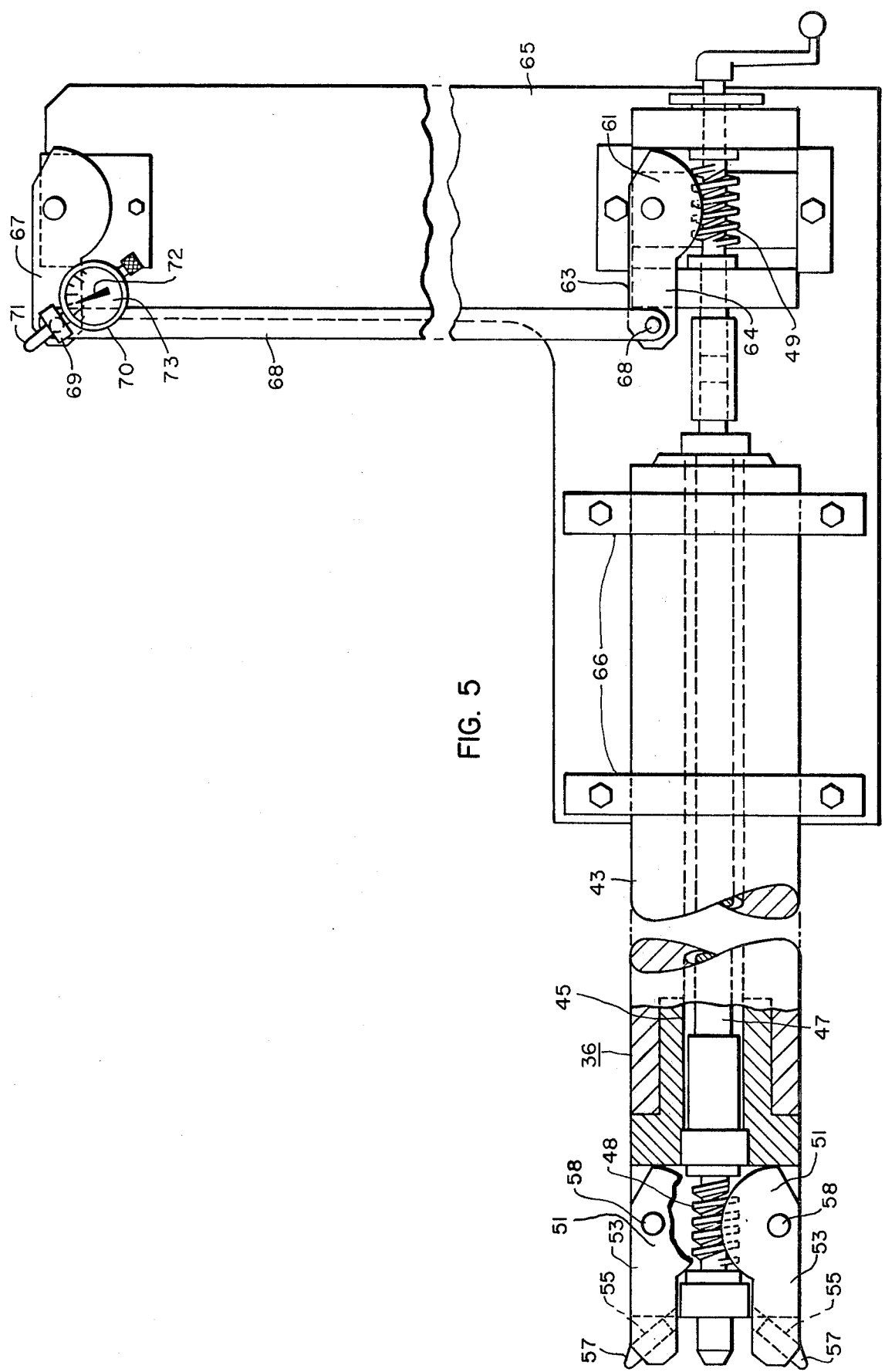
FIG. 5 is an enlarged elevational view of a boring bar with an indicator attached.
Figure 6:
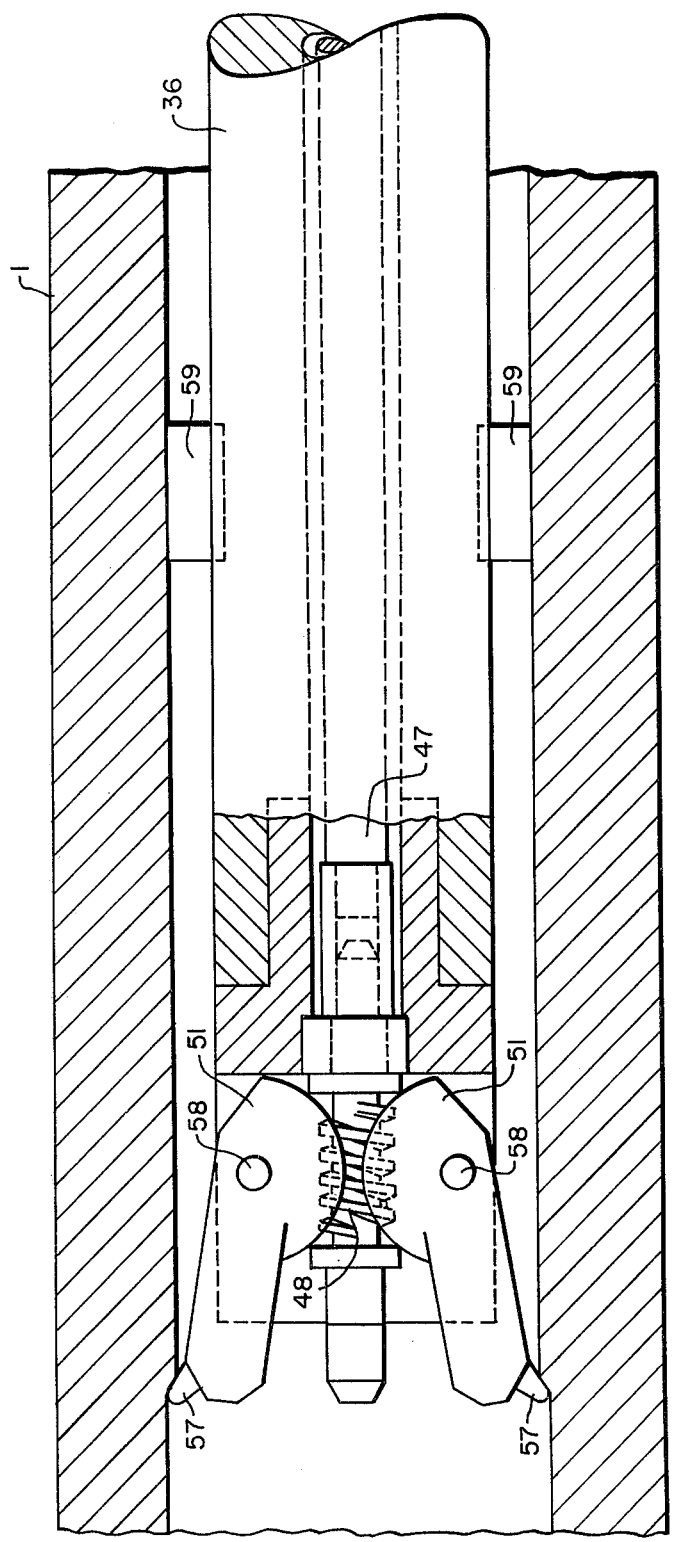
FIG. 6 is an enlarged partial, sectional view of a boring bar in a rotor.

As shown in FIGS. 5 and 6, the boring bar 36 comprises a cylindrical bar 43 having a central bore 45 extending therethrough, and a shaft 47 rotatably disposed in the central bore 45. The shaft 47 has worm gears 48 and 49 disposed adjacent opposite ends thereof. A pair of wheel segments 51 are pivotally mounted within the bar 43 to engage the worm gear 48. The wheel segments 51 have integral arms 53 extending therefrom. The arms 53 have a rectangular shaped hole 55 extending therethrough for receiving a cutting tool 57 which is ground to provide proper shaped cutting edges. After the tools 57 are ground, they are disposed an equal distance from the wheels' 51 pivot points 58. In the preferred embodiment, two cutting edges are utilized; however, the number of cutting edges may be varied depending on the original diameter of the bore in the rotor 1.

As shown in FIG. 6, the boring bar 36 has a plurality of bearing pads 59 disposed adjacent the end containing the cutting tools 57. The bearing pads 59 rotatably support the boring bar in the rotor bore near the cutting operation and preferably are made of babbitt, brass or other soft bearing material so as not to damage the walls of the bore upon which they bear. To provide support for the cutting end of the boring bar 36, the cutting operation normally takes place as the boring bar 36 is being drawn out of, or retracted from, the bore, thus the bearing pads 59 support the boring bar 36 as close to the cutting tools 57 as possible.

The worm gear 49 is disposed on the end of the shaft 47 away from the cutting tools 57 and has a segment of a wheel 61 pivotally disposed in engagement therewith. The segment of the wheel 61 has an integral arm 63 extending therefrom. The wheel 61 and arm 63 cooperate to form a crank 64. The wheel segment 61 is pivotally mounted on a base plate 65, which is attached to the boring bar 36 by a pair of clamps 66. The base plate 65 forms the stationary member of a four-bar parallel crank linkage. The wheel segment 61 and integral arm 63 serve as one of the cranks 64 of the four-bar linkage. Another crank 67 is conveniently, but not necessarily, made up of a wheel and arm, and is pivotally disposed on the base plate 65. A connecting bar 68 is pivotally connected at opposite ends to the cranks 64 and 67. The distance between pivot points on the cranks 64 are 67 are equal and the distance between the pivot points on the connecting bar 68 and on the base plate 65 are equal to produce a parallel crank four-bar linkage.

Attached to the crank 67 is a mounting bracket 69 into which is fastened a dial indicator 70 or other indicating means. The dial indicator 70 has a contact point 71, which has a cross-section that is generally the same shape as the cutting edge on the cutting tool 57. Because of the four-bar linkage, the contact point and cutting edge are cooperatively associated so that they move in unison. The dial indicator 70 also has a pointer 72 and a dial face 73 which can be rotated. The dial has idicia on its face, which increase in both directions from zero in order to indicate movement in either direction from a set point.

A template 75 representative of the shape of the desired enlargement of the bore is attached to the boring bar support and traverse means 27. The template 75 is disposed a predetermined distance from the desired enlargement in the bore and has a line or preferably a surface representative of the existing bore in the rotor 1 and this line or surface is extended to be representative of the shape of the desired enlargement of the bore. The dial indicator 70 is disposed so that the contact point 71 engages that portion of the template 75 representative of the existing bore.

The shaft 47 has a crank 79 or other means by which it can be rotated, turning the worm gears 48 and 49, which causes the wheel segments 51 and 61 or pivot or rotate. Rotation of the wheel segments 51 results in the cutting tool swinging inwardly toward the axis of the rotor or outwardly away from the axis of the rotor and into cutting engagement with the bore of the rotor depending on the direction in which the crank is rotated. Simultaneously, the wheel segment 61 operates the parallel crank four-bar linkage so that the crank arm 67 moves in unison with the wheel segments 51 and 61 and the contact point 71 on the dial indicator 70 moves in unison with the cutting edges of the cutting tools 57.

To enlarge a portion of an axial bore in a rotor 1 of a machine such as steam turbine, the proper diameter boring bar 36 and bearing pads 59 are selected so that the bearing pads 59 slidably engage the walls of the bore. The cutting tools 57 are positioned so that the cutting edges are equidistant from the pivot points 58. The dial indicator 70 is disposed so that its contact point in the middle range of its travel, generally the same distance from its pivot point as the cutting edges are from their pivot points. The rotor 1 is positioned on the rotor supporting and turning means 2 so that it rotates on the bearing support means 5 about its longitudinal axis and is supported against thrust by the thrust bearing support 11. The boring bar 36 is axially aligned with the rotor 1 and the cutting edges on the cutting tool 57 are moved inwardly to clear the walls of the bore in the rotor. The boring bar 36 is inserted into the rotor 1 by operating the carriage drive means 35 at its high rate of speed. The cutting edges are moved past the area to be enlarged and the rotor drive means 15 is operated rotating the rotor at a predetermined speed, which is suitable for boring. The shaft 47 is rotated until the cutting edges just touch the walls of the bore. The template 75, which has a surface or line which duplicates a half-sectional view of the desired enlargement is positioned so that the portion representing the bore is in engagement with the contact point 71 and the template 75 is so disposed that the pointer 72 indicates zero at which point the contact point should be the same distance from its pivot point as the cutting edges are from their respective pivot points. The shaft 47 is rotated until the pointer 72 on the dial indicator 70 indicates that the cutting edges are cutting the desired amount of material from inside of the bore and the carriage drive means 35 is operated at its low speed retracting the boring bar 36 from the bore. The boring bar 36 is retracted a distance less than the distance between the cutting edge and the bearing pads 59 and then returned to the origin of the cut. The cutting tools are moved outwardly to cut deeper on successive cuts, until the dial indicator signals that the cutting edges have enlarged that portion of the bore the desired amount.

Similar successive operations are repeated until the enlargement in the bore is completed.

The dial indicator 70 and template 75 cooperate to provide a continuous indication of the location of the cutting tool with respect to the desired enlargement.

We claim as our invention:

1. Apparatus for enlarging a portion of an axial bore in a rotor, said apparatus comprising:
   means for supporting said rotor and rotating said rotor about its longitudinal axis,
   a boring bar, axially aligned with said rotor,
   means for moving said boring bar generally rectilinearly back and forth along the axis of said rotor,
   said boring bar having a shaft rotatably disposed therein, said shaft having a worm gear disposed adjacent each end thereof and at least one segment of a wheel pivotally mounted in engagement with each of said worm gears, the wheel on one end having a cutting edge mounted thereon and the wheel on the other end having indicating means cooperatively associated therewith so that said indicating means and cutting edge move in unison,
   means for rotating said shaft in said boring bar, and
   a template representative of the shape of the desired enlargement in said bore of said rotor and disposed a predetermined distance from the desired enlargement,
   whereby when enlarging said bore in said rotor said indicating means and template cooperate to indicate the position of said cutting edge relative to the desired shape of the enlargement.

2. Apparatus as set forth in claim 1, wherein the wheel cooperatively associated with the indicator is one of the two cranks in a four-bar linkage and the indicating means is mounted on the other crank.

3. Apparatus as set forth in claim 1, wherein the wheel cooperatively associated with the indicating means is one of two cranks in parallel crank four-bar linkage and the indicating means is mounted the other crank forming the parallel crank four-bar linkage.

4. The apparatus as set forth in claim 1, wherein the boring bar has two segments of a wheel pivotally mounted in engagement with one worm gear, each of said segments having a cuttng edge mounted thereon.

5. The apparatus as set forth in claim 1, wherein the boring bar has bearing means disposed adjacent the end containing the cutting edges.

6. The apparatus set forth in claim 1, wherein the indicating means is a dial indicator.

7. The apparatus as set forth in claim 1, wherein the dial indicator has a contact point that generally has the same cross-section as the cutting edge.

8. The apparatus as set forth in claim 1, wherein the segment of the wheel having the cutting edge mounted thereon has an arm made integral therewith and the cutting edge is mounted on the arm.

9. The apparatus as set forth in claim 1, wherein the segment of the wheel cooperatively associated with the indicating means has an integral arm and forms a crank of a four-bar parallel crank linkage, the stationary link being attached to the boring bar and the other crank forming the part of the four-bar linkage having the indicating means mounted thereon, whereby the indicating means is spaced from the boring bar.

10. The apparatus as set forth in claim 9, wherein the indicating means is a dial indicator and the template has a line representative of the existing bore and the dial indicator has a contact point generally the same cross-section as the cutting edge and the contact point and cutting edge being disposed the same distance from their respective pivot points, the template being movably disposed so that the contact point and line are in engagement whereby the dial indicator can be set to indicate the position of the cutting edge relative to the existing bore.

11. The apparatus as set forth in claim 1, wherein the means for moving the boring bar generally rectilinearly has a fast rate for positioning the boring bar and a slower rate for boring.

* * * * *